Nov. 10, 1959   C. W. CAPP ET AL   2,912,471
CHLORINATION OF BUTADIENE
Filed March 6, 1957
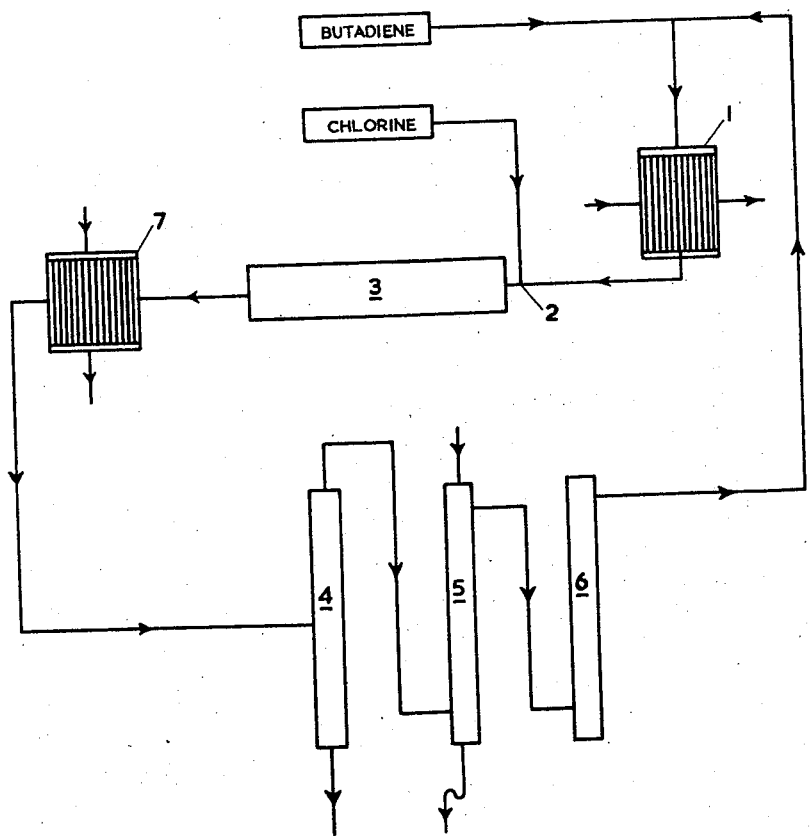
INVENTORS.
CLIFFORD WILLIAM CAPP.
HENRY PETER CROCKER
FREDERICK JAMES BELLRINGER
BY
Ward heal Haselton Dume & McElhannon
ATTORNEYS.

2,912,471
CHLORINATION OF BUTADIENE

Clifford William Capp, Ewell, Henry Peter Crocker, Lower Kingswood, and Frederick James Bellringer, Leatherhead, England, assignors to The Distillers Company Limited, Edinburgh, Scotland, a British company Application March 6, 1957, Serial No. 644,299

Claims priority, application Great Britain March 21, 1956

8 Claims. (Cl. 260—654)

The present invention relates to the preparation of dichlorbutenes and in particular to an improved process for preparing dichlorbutenes by the vapor phase chlorination of butadiene.

The additive chlorination of butadiene in the vapor phase to produce dichlorbutenes is well known. Hitherto, the primary difficulty in obtaining good yields of the desired products has been in controlling the reaction conditions to minimize the formation of by-products. In a catalytic process described in the art, preheated butadiene and chlorine are introduced into a reaction zone packed with carbon chips and maintained at a temperature between 150° C. and 300° C. In this process, it is necessary to maintain the temperature below 300° C. in order to prevent substitution chlorination of the butadiene and other undesirable side reactions from taking place. The use of catalysts, however, is in some respects undesirable and tends to lead to difficulties, for instance in temperature control and in fouling of the catalyst. In non-catalytic processes, however, it has been found necessary, in order to obtain high yields of the desired dichlorbutenes and to minimize substitution chlorination of the butadiene to use two reaction zones, in the first of which butadiene is contacted with the chlorine at a relatively low temperature, for instance about 140° C. to 220° C., and for a short contact time, for instance up to about 2 seconds. The gaseous reaction mixture is then passed to a second reaction zone which is maintained at a high temperature, for instance between 200° C. and 450° C., the contact time in this zone being relatively long, for instance from 12 seconds to 2 minutes. The use of such long contact times necessitates the provision of large and expensive reactors. Furthermore, high temperatures and long contact time in the second reaction zone might lead to the formation of undesirable products by pyrolysis of the primary reaction products.

It is an object of the present invention to provide an improved process for the additive chlorination of butadiene in the vapor phase.

According to the present invention, the process for the production of dichlorbutenes by the non-catalytic additive chlorination of butadiene in the vapor phase comprises contacting chlorine with butadiene in the ratio of at least one mole of butadiene per mole of chlorine in an unpacked reaction zone at a temperature within the range of about 280° C. to 400° C. for not more than 12 seconds.

It is an essential feature of the invention that the temperatures and contact times used in carrying out the process are within the limits specified in the preceding paragraph. The contact times given are based on the volumes occupied by the reactants at normal temperature and pressure. If temperatures substantially higher than about 400° C. are used, the extent of substitutive chlorination of the butadiene is increased. On the other hand, if temperatures lower than about 280° C. are used, the reaction is slow. It is preferred to use temperatures between 290° C. and 330° C. The contact time should be no longer than is necessary to enable the reaction to proceed to give good yields of the desired products, as at the higher temperatures the tendency towards the occurrence of side-reactions increases as the contact time increases.

The chlorine and the butadiene may be separately preheated before being passed into the reactor. This is because of the importance of controlling the conditions so that reaction only occurs within the desired temperature range. It is, however, preferred to preheat only the butadiene, suitably to a temperature below the range of temperatures at which the reaction is carried out, such as between 150° and 300° C.

The proportion of butadiene to chlorine used in the process of the present invention is at least one mole of butadiene per mole of chlorine. Higher proportions of butadiene than this may be used. If large excesses of butadiene are used, it may be necessary to recover or recycle the unreacted butadiene in order to make the process of the invention commercially economical. The large excess of butadiene also may be advantageous in operation of the process in that it absorbs heat from the reaction, thus making unnecessary some or all of the means used for controlling the heat of the reaction zone. Alternatively, a similar effect may be obtained by using an inert diluent such as nitrogen in place of some of the excess butadiene.

The process of the invention is carried out non-catalytically in a reaction zone which contains no packing or contact material. It has been found that not only does the presence of such packing material have no beneficial effect on the operation of the process, but it has in fact a detrimental effect on it. Packing materials promote the formation of carbon and other deposits on their surfaces, thus causing blockages in the zones. The absence of packing materials from a reactor also renders the cleaning of the reactor after use a relatively easy matter. Furthermore, if the reaction is arranged to take place simultaneously in a number of reactors, such as for instance in multiple tubes which during the operation of the process become covered to a greater or lesser extent with deposits, the absence of packing material facilitates the establishment of the same reaction conditions in each of the reactors.

In the reaction of butadiene with chlorine it is necessary to ensure that the two reactants are rapidly and thoroughly mixed. If the mixing is insufficient, high local concentrations of chlorine may occur which result in lowering of the yield of the desired products due to the formation of by-products; furthermore, the heat generated during the reaction is unevenly distributed through the reaction zone and this may lead to the occurrence at various points in the zone of temperatures which are above those at which good yields of the desired products are obtained. Adequate mixing of the reactants may be ensured using any suitable means.

The process of the invention may be carried out at atmospheric, subatmospheric or superatmospheric pressures. Preferably the process is carried out at atmospheric pressure.

The mixture emerging from the reaction zone after cooling may be separated into its constituents by any suitable means. This may conveniently be done by a process of continuous distillation, whereby the desired dichlorbutenes are recovered in a substantially pure form. The two dichlorbutenes, 1:4-dichlorbutene-2 and 3:4-dichlorbutene-1 are produced by the process. If it is desired to recycle the unreacted butadiene back to the reaction zone the small amounts of hydrogen chloride produced by substitution chlorination may be removed from the butadiene by any suitable known means, such as by washing the latter with water, and thereafter drying the butadiene.

If the butadiene or the chlorine used in the process contains small quantities of inert substances, these may accumulate in the apparatus in which the process is carried out after repeated recycling but may be removed by removing a small bleed from the apparatus.

The apparatus used in carrying out the process of the present invention may be of any suitable form but is preferably in the form of one or more tubes. A multi-tubular reactor is particularly useful for this purpose because in such a reactor it is comparatively easy to control the temperature of the reaction.

The process of the present invention may advantageously be carried out partly or wholly in an adiabatic manner such that a rise in temperature within the specified limits occurs.

The following examples are given further to illustrate the process of the invention.

*Example 1*

The reactor used was a glass tube the reactor volume of which was 3 parts by volume, immersed in a liquid bath of molten sodium nitrite-potassium nitrate. Butadiene and nitrogen were introduced through a preheating coil into the bottom of the tube, being preheated to approximately 230° C. and chlorine was introduced via a jet into the butadiene stream at the bottom, the jet ensuring highly efficient mixing of the reactants. The reactor products were passed into a fractionating column, at the head of which butadiene and hydrogen chloride were removed and at the kettle of which butadiene chlorination products were removed.

Butadiene at the rate of 27,500 parts by volume per hour, chlorine at the rate of 12,600 parts by volume per hour and nitrogen at the rate of 2,000 parts by volume per hour were fed at a reactor temperature of 370° C., these volumes being calculated at normal temperature and pressure. The time of contact was 0.26 second. The products were fractionated and the fractions analysed by infra-red and gas chromatographic methods. The product contained:

|  | Percent by weight |
|---|---|
| Dichlorbutenes | 79 |
| Low boilers | 9 |
| High boilers | 11 |

*Example 2*

The reactor used was similar to that used in Example 1 except that the capacity was 2.5 parts by volume. Butadiene at the rate of 31,200 parts by volume per hour and chlorine at the rate of 15,400 parts by volume per hour were fed at a preheater temperature of 240° to 250° C. giving a reactor temperature of 330 to 370° C., these volumes being calculated at normal temperature and pressure. The time of contact was 0.23 second. The product contained:

|  | Percent by weight |
|---|---|
| Dichlorbutenes | 81.5 |
| Low boilers | 8.3 |
| High boilers | 10.2 |

*Example 3*

The reactor used was similar to that used in Example 2. Butadiene at the rate of 31,500 parts by volume per hour and chlorine at the rate of 6,200 parts by volume per hour were fed at a reactor temperature of 337° C., these volumes being calculated at normal temperature and pressure. The time of contact was 0.24 second. The butadiene was preheated to about 330° C. The product contained:

|  | Percent by weight |
|---|---|
| Dichlorbutenes | 85.8 |
| Low boilers | 1.8 |
| High boilers | 12.3 |

*Example 4*

The reactor used was similar to that used in Example 1 except that the capacity was 5 parts by volume and that it was constructed of Firth-Vickers F.D.P. stainless steel. Butadiene at the rate of 22,300 parts by volume per hour and chlorine at the rate of 6,300 parts by volume per hour were fed at a reactor temperature of 350° C., these volumes being calculated at normal temperature and pressure. The time of contact was 0.63 second. The butadiene was preheated to 290° C. The product contained:

|  | Percent by weight |
|---|---|
| Dichlorbutenes | 88.6 |
| Low boilers | 4.9 |
| High boilers | 6.5 |

*Example 5*

Butadiene was chlorinated in the reactor system illustrated as a flow diagram in the accompanying drawing.

Recycle butadiene was mixed with fresh butadiene and the mixture preheated in preheater 1 to 215–220° C. The preheated hydrocarbon was intimately mixed with chlorine at a T-piece, 2, and the mixture was passed into the reactor, 3, which was a lagged metal tube of a capacity of 7 parts by volume. The reactor products were passed into a fractionating column 4 at the head of which butadiene and hydrogen chloride were removed, and at the base of which butadiene chlorination products were removed. The mixture of butadiene and hydrogen chloride leaving the top of the fractionating column, 4, was washed with water in the scrubber 5, to remove hydrogen chloride and the residual butadiene was carefully dried by conventional methods in drier 6 and recycled to the preheater 1.

With the fresh butadiene feed rate at 2,150 parts by volume per hour, chlorine 2,150 parts by volume per hour and butadiene recycle rate of 9,600 parts by volume per hour, the maximum reactor temperature was 345–355° C. The contact time was 1.4 seconds.

The chlorination products from the base of column 4 consisted of 89.4% by weight of dichlorbutenes, 3.5% by weight of low boilers and 6.1% of high boilers.

*Example 6*

Recycle butadiene was mixed with fresh butadiene and the mixture preheated to 243–247° C. The preheated hydrocarbon was intimately mixed with chlorine at a T-piece, and the mixture was passed into the reactor which was a lagged glass tube of 12 parts by volume. The reactor products were passed into a fractionating column at the head of which butadiene and hydrogen chloride were removed, and at the base of which butadiene chlorination products were removed. The mixture of butadiene and hydrogen chloride leaving the top of the fractionating column was washed with water to remove hydrogen chloride and the residual butadiene was carefully dried by conventional methods and recycled. A bleed of 100–300 parts per hour was taken from the recycle stream to prevent the build up of inert materials in the system.

With the fresh butadiene feed rate at 6,500 parts by volume per hour, chlorine 6,300 parts by volume per hour and butadiene recycle rate of 22,500 parts by volume per hour, the maximum reactor temperature was 350 to 365° C. The contact time was 1.2 seconds.

The chlorination products consisted of 91.4 weight percent of dichlorbutenes, 2.5% low boilers, and 6.1% high boilers. The yield of dichlorbutenes based on the butadiene fed was 88%.

*Example 7*

Butadiene was chlorinated in the reactor system described in Example 6, in this case the reactor being a lagged metal tube of 18 parts by volume.

With the fresh butadiene feed rate at 2,250 parts by volume per hour, chlorine 2,200 parts by volume per hour and butadiene recycle rate of 8,750 parts by volume per hour, a preheater temperature of 193–198° C. gave a maximum reactor temperature of 340° C. The contact time was 4.8 seconds. A bleed of 20 parts by volume per hour was removed from the recycle stream to prevent build up of inert materials in the system.

The chlorination products consisted of 94% by weight of dichlorbutenes, 1% by weight of low boilers and 5% by weight of high boilers. The yield of dichlorbutenes based on butadiene fed was 92.7%.

Example 8

The process of Example 7 was repeated in two runs. The reaction conditions and results are set out in the following table:

|  | Run 1 | Run 2 |
|---|---|---|
| Preheater temperature (° C.) | 210–215 | 190 |
| Reactor (parts by volume) | 18 | 18 |
| Maximum reactor temperature (° C.) | 340 | 320–330 |
| Contact time (seconds) | 5.3 | 10 |
| Bleed rate (parts by volume per hour) | 60 | 250–300 |
| Fresh butadiene fed (parts by volume per hour) | 1,750 | 1,100 |
| Chlorine fed (parts by volume per hour) | 1,700 | 820 |
| Butadiene recycle rate (parts by volume per hour) | 8,750 | 4,400 |
| Product (weight percent): |  |  |
| Dichlorbutenes | 88.7 | 93.0 |
| Low boilers | 4.9 | 1.9 |
| High boilers | 6.4 | 5.1 |
| Percent yield of dichlorbutenes based on butadiene fed | 87.0 | 90.2 |

We claim:

1. The process for the production of dichlorbutenes by the non-catalytic additive chlorination of butadiene in the vapor phase which comprises contacting chlorine with a substantially unreacted stream of butadiene in the ratio of at least one mole of butadiene per mole of chlorine in an unpacked reaction zone at a temperature within the range of about 280° to 400° C. for not more than 12 seconds.

2. The process as claimed in claim 1 wherein the temperature is between about 290° C. and 330° C.

3. The process as claimed in claim 1 wherein the butadiene is preheated before being contacted with the chlorine.

4. The process as claimed in claim 1 wherein unreacted butadiene is recycled.

5. The process as claimed in claim 1 wherein the reaction is carried out in the presence of an inert diluent.

6. The process as claimed in claim 1 wherein the reaction is carried out adiabatically.

7. A process which comprises reacting butadiene with chlorine in a single reaction zone by introducing the well mixed reactants in the vapor phase, as a stream of substantially unreacted butadiene and chlorine in the ratio of at least one mole of butadiene per mole of chlorine, the butadiene being preheated, into a single unpacked reaction zone at 280° C. to 400° C. for about 0.23 to 12 seconds to produce dichlorbutenes.

8. A process which comprises forming a mixture of unreacted butadiene and chlorine in a ratio of at least one mole of butadiene to one mole of chlorine and passing it in the vapor phase into an unpacked reaction zone at a temperature within the range of about 280° C. to 480° C. for not more than 12 seconds to produce dichlorbutenes.

References Cited in the file of this patent

FOREIGN PATENTS 661,806    Great Britain _____ Nov. 28, 1951

OTHER REFERENCES

Ser. No. 287,249, Schmidt (A.P.C.), published Apr. 20, 1943.